June 16, 1931. H. C. LORD 1,810,872
FRICTION DEVICE
Filed Nov. 13, 1925
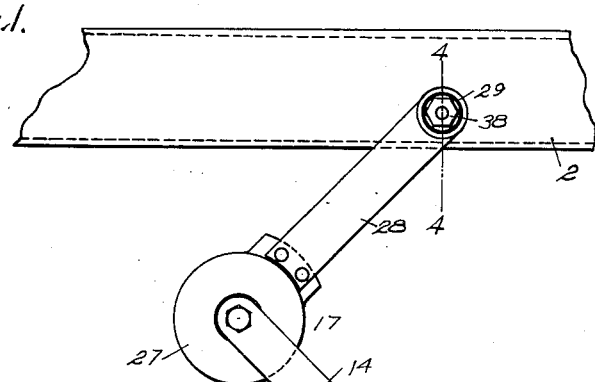
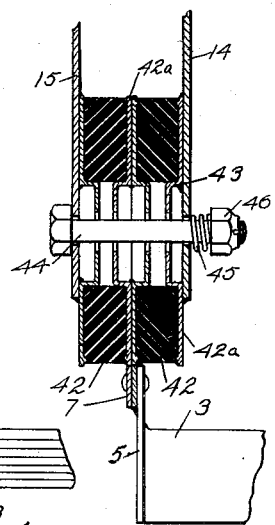
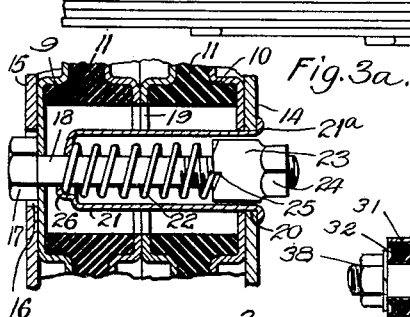
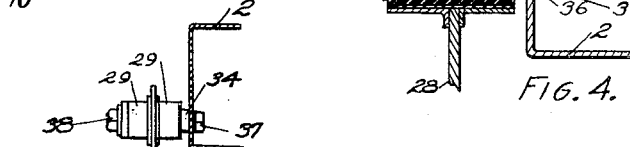
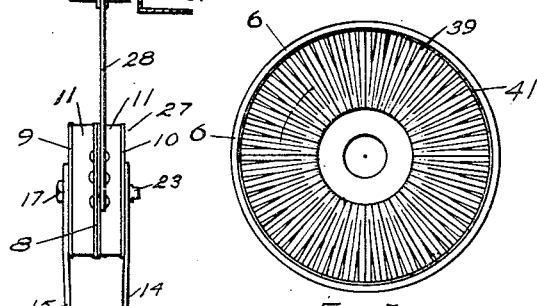
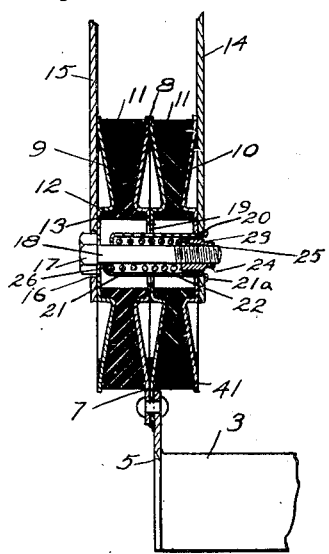
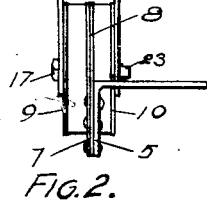
INVENTOR.

Patented June 16, 1931

1,810,872

UNITED STATES PATENT OFFICE

HUGH C. LORD, OF ERIE, PENNSYLVANIA

FRICTION DEVICE

Application filed November 13, 1925. Serial No. 68,795.

This friction device is particularly advantageous in vibration dampeners and as exemplified is used in connection with such dampeners. In such devices it is desirable to permit an initial movement of the moving members without frictional resistance as such movements do not usually represent objectionable vibrations and to interpose frictional dampening action when the amplitude of movement exceeds what may be determined is desirable. In carrying out the present invention with relation to dampeners, rub members, preferably of metal, are utilized with broken surfaces preferably ribbed in a direction transversely to the path of rubbing movement and engage this rubbing surface with a pad of rubber which as the active members move is drawn or rubbed over this ribbed surface. This action of the rubber on a ribbed surface is an advantageous one in that it prevents the formation of a vacuum between the rubber and the rub surfaces and in addition works the rubbing surface of the rubber with an undulating movement as the rubber moves over the surface which interposes a resistance differing from a purely frictional resistance. Where this is used as a dampener with rotary rub faces the rubber yields with the initial rotative movement and this may be made greater or less by varying the thickness of the rubber and by varying the tension of the frictional engagement. It may be desirable to vary the thickness of the walls of the rubber so that all the rubber may be equally stressed in the operation of the device. To this end, the rubber pad is preferably thickened as it approaches the periphery. Further features and details will appear from the specification and claims.

The invention is illustrated in the accompanying drawings as follows:—

Fig. 1 shows a side elevation of the device.
Fig. 2 an end elevation of the device.
Fig. 3 a section on the line 3—3 in Fig. 1.
Fig. 3a an enlarged sectional view of the spring pressure mechanism.
Fig. 4 a sectional view of the attaching joint on the line 4—4 in Fig. 1.
Fig. 5 a side elevation of one of the rub plates.
Fig. 6 an enlarged sectional view of one of the rub plates with the rubber engaging the same.
Fig. 7 a sectional view showing an alternative construction.

As shown the device is attached to an automobile in which 1 marks the axle, and 2 a frame member.

A securing plate 3 is clamped to the axle by spring clamps 4. This has a vertically arranged flange 5. This flange is attached by riveting 6 to the extensions 7. The extensions 7 project from the central rub plates 8.

The rub plates 8 are conically shaped and opposed by similarly shaped outer rub plates 9 and 10. Discs of rubber 11 are placed between the rub plates 8 and 9 and 8 and 10, and are made of a form to fit the conical surfaces, the rubber being thicker at the periphery than the center yields to a greater distance with the same force than the rubber at the center and thus compensates for the greater movement of the discs at the periphery than nearer the center. The rub plates are bent outwardly toward the center forming shoulders 12 which engage annular ribs or shoulders 13 along the inner edges of the rubber pads 11, thus maintaining the parts in a concentric relation.

Connecting levers 14 and 15 are secured to the outer rub plates, preferably by spot welding. The lever 15 has a hexagonally shaped opening 16 at its end adapted to receive a head 17 of a bolt 18. The bolt 18 extends through the rub plate 9 and through an enlarged opening 19 in the rub plates 8 and through an opening 20 in the rub plate 10 and lever 14. A spring cup 21 having the flanged end 21a is forced into the opening 20 and a spring 22 is housed in this cup. A nut 23 is screwed on to the bolt against the spring, the nut having wrench holds at 24 at its outer end and its inner end cylindrical and fitting the cup. The inner face of the nut is serrated as at 25 to engage the end of the spring and the bottom of the cup forming a base for the spring has a similar serration 26 for engaging the end of the spring, these serrations locking the nut against unscrewing on the bolt.

The levers 14 and 15 extend to a central friction element 27, a duplicate of the friction element secured directly to the axle and the levers 14 and 15 are secured to the outer rub plates of this element so that with the wearing of the two elements the levers remain in parallel. A lever 28 extends from the central rub plates to a joint on the frame.

The lever 28 has the thimbles 29 secured thereto by spot welding and the oscillating joint having a rubber insert 30, the outer shell 31 and the central shell 32 is secured in the thimble 29, preferably by a pressed fit. The rubber 30 is bonded to the shell 31 and 32 so that the oscillating movement is accomplished through the distortion of the rubber. A stud 33 has a shoulder 34 and extension 35 passing through an opening 36 in the frame. A nut 37 clamps the stud in place in the frame and a nut 38 on the outer end of the stud clamps the sleeve between the shoulder 34 and the nut locking the sleeve 32 against rotation.

The rub plates are provided with radial ribs 39. These are preferably very shallow ribs and form the creases 40 between them, as shown in Fig. 6. The rubber as it is moved over these has an undulating movement passing slightly into creases 40 and outwardly over the ribs. This movement not only works the rubber but adds to the rubbing resistance modifying it from a straight sliding movement on a flat disc. Further the broken surface prevents the formation of a vacuum under the rubber and at the same time permits of the use of a practically solid disc so that the greatest possible mass of rubber may be used giving a full wearing surface.

In the operation of the device the small relative movements between the frame and axle are taken up by the distortion or circumferential yielding of the rubber, this permitting of the small movements which are of great frequency in the ordinary use of the machine without abrasive action on the rubber. The amplitude of the movement that is taken care of by the yielding of the rubber can be increased or diminished by the thickness of the rubber, the quality of the rubber, and by the tension placed upon the spring 22. Ordinarily the amplitude of the yielding movement should be as great as is compatible with the dampening of objectionable vibrations. This range is quite large with the ordinary springs in that objectionable vibration is immediately dampened by the rubbing or frictional action of the rubber beyond the yielding range.

A circumferential rib 41 is arranged around the ends of the ribs 39, preferably at about the same height as the ribs 39. The rubber engaging this rib seals the face of the device against moisture but the rib is not of sufficient area to permit of the formation of a vacuum at this point.

If desired, the rubber pads may be made with parallel faces and in Fig. 7 a structure is shown in which pads 42 are so formed. In this, the rub plates 42a are ribbed and operate in the same manner as the rib shown in Fig. 5.

The rub plates have the inwardly extending shoulders 43 against which the inner periphery of the pads abuts, thus maintaining the parts in concentric relation. A bolt 44 extends through the plates. A spring 45 is arranged at the end of the bolt and is tensioned by a nut 46.

It will be noted that the yielding of the rubber makes what is known as a free center in that the smaller movements are resisted very slightly, this resistance increasing until the frictional engagement between the rubber and the plate is overcome, the rubber rubbing through movement beyond this point. It will also be noted that the device is self centering to adjust itself to different conditions of load changing its initial position immediately with the first shock with any new condition of load. It will further be noted that the yielding of the frictional element relieves this element of all wear except where frictional dampening is desirable. Thus the major part of the movement to which the members are subjected is without wear on the surfaces. It will also be noted that by forming the yielding joint comprising the rubber member 30 the yielding of this member adds to what may be termed the free center of the mechanism and assists in absorbing incipient motions of the apparatus. The joint is only subjected to the forces of the dampening device and, therefore, can be made more or less yielding with this in view.

Thus the frictional members 11 with their plates and parts for securing them together in frictional engagement with the initial yielding as above described forms what I term a dampening mechanism. The joint comprising the rubber 30 forms a connection in which there is a rubber means and this joint and rubber means is subjected only to the force of the dampening mechanism.

What I claim as new is:—

1. In a friction device, the combination of two relatively movable members; a rubbing plate having a broken surface on one member; and a rubber friction pad abutting on the other member and acting on said surface.

2. In a friction device, the combination of two relatively moving members; a rubbing plate having a friction surface with protuberances thereon; and a rubber friction pad abutting on the other member and acting on said surface.

3. In a friction device, the combination of two relatively moving members; a rubbing plate on one of said members, said plate having cross ribs; and a rubber friction pad abutting on the other member and acting on said surface.

4. In a friction device, the combination of two relatively moving members; a rubbing plate having a broken surface on one member; and a rubber friction pad abutting on the other member and acting on said surface, said rubber pad yielding initially with the relative movement of the members and rubbing with a more extended movement.

5. In a friction device, the combination of two relatively moving members; a rubbing plate on one member having a friction surface with protuberances thereon; and a rubber friction pad abutting on the other member and acting on said surface, said rubber pad yielding initially with the relative movement of the members and rubbing with a more extended movement.

6. In a friction device, the combination of two relatively moving members; a rubbing plate having a broken surface on one member; a rubber friction pad abutting on the other member and acting on said surface; and means for maintaining approximately uniform pressure on the pad.

7. In a friction device, the combination of two relatively moving members; a rubbing plate having a broken surface on one member; a rubber friction pad abutting on the other member and acting on said surface, said rubber pad yielding initially with the relative movement of the members and rubbing with a more extended movement; means for maintaining approximately uniform pressure in action on the pad; and means for adjusting this pressure.

8. In a friction device, the combination of two relatively rotatively movable members; a rubbing plate having a broken surface on one member; and a rubber friction pad abutting on the other member and acting on said surface.

9. In a friction device, the combination of two relatively rotatively movable members; a rubbing plate having a broken surface on one member; and a rubber friction pad abutting on the other member and acting on said surface, said rubber pad yielding initially with the relative movement of the members and rubbing with a more extended movement, said pad being self centering.

10. In a friction device, the combination of two relatively rotatively moving members; and interposed friction means between said members initially yielding and frictionally rubbing said surface on a further rotative movement, said interposed means varying in yieldability radially.

11. In a friction device, the combination of two relatively rotatively moving members; and a rubber friction pad between said members, said pad being thicker near the outer periphery than the center.

12. In a friction device, the combination of two relatively rotatively moving members, one of said members having a broken friction surface; and a rubber pad between said members, said pad being thicker near its periphery than toward its center.

13. In a friction device, the combination of two relatively rotatably moving members; a rubbing plate on one of the members having radially arranged ribs thereon and a sealing rib around its periphery; and a rubber pad between the member operating on said ribs.

14. In a friction device, the combination of two relatively rotatably moving members; a rubbing plate on one of the members having radially arranged ribs thereon; a rubber pad between the members operating on said ribs; and means for exerting approximately uniform pressure on the pad comprising a spring.

15. In a friction device, the combination of two relatively rotatably moving members having limited back and forth movement; a rubber pad between the members; and means for maintaining an approximately uniform pressure on the pad comprising a spring.

16. In a friction device, the combination of two relatively rotatably moving members having limited back and forth movement; a rubber pad between the members; means for maintaining a uniform pressure on the pad comprising a spring; and means for adjusting the pressure.

17. In a friction device, the combination of two relatively rotatably moving members; a rubber pad between the members; and means for exerting pressure on the pad comprising a spring, said spring extending between the members.

18. In a friction device, the combination of two relatively rotatably moving members; a rubber pad between said members; a spring for exerting pressure on the members; a spring cup extending between the members from one of the members forming a seat for the spring; a bolt extending through the members and the cup; and a nut on the bolt extending into the cup.

19. In a friction device, the combination of two relatively rotatably moving members; a rubber pad between said members; a spring for exerting pressure on the members; a spring cup extending between the members from one of the members forming a seat for the spring; a bolt extending through the members and the cup; a nut on the bolt extending into the cup; and means acting through the spring between the cup and nut locking the nut on the bolt.

20. In a vibration dampener, the combination of two relatively movable members having limited back and forth movement; a rub plate on one member; a friction member yieldingly carried by one of the movable members and rubbing on the other movable member; and means for applying approximately constant pressure on the friction member comprising a spring, said friction member yielding without sliding with an initial movement of the movable members and rubbing with a maximum movement back or forth of said members.

21. In a vibration dampener, the combination of two relatively movable members having limited back and forth movement; a friction member comprising a rubber pad yieldingly carried by one of the movable members and rubbing on the other movable member; and means for applying approximately constant pressure on the friction member comprising a spring, said friction member yielding without sliding with an initial movement of the members and rubbing with a maximum movement back or forth of said members.

22. In a friction device, the combination of two relatively rotatably moving members; and a friction pad between said members comprising a rubber pad thicker nearer the outer periphery than the center, said pad yielding with an initial movement of the members and sliding with a greater movement of the members.

23. The combination of relatively movable members; a dampening mechanism; and a connection between the mechanism and one of the members comprising a resilient rubber means responsive to connection movement through its distortion and subjected only to the force of the mechanism.

24. The combination of relatively movable members; a dampening mechanism resisting movement in both directions; and a connection between the mechanism and one of the members comprising a resilient rubber means responsive to connection movement through its distortion and subjected to the force of the mechanism in both directions.

25. The combination of a dampening mechanism; and a pivotal connection for assembling the mechanism in operative position comprising a resilient yielding rubber means responsive to connection movement through its distortion and subjected only to the force of the mechanism.

26. The combination of a dampening mechanism resisting movement in both directions; and a pivotal connection for assembling the mechanism in operative position comprising a resilient yielding rubber means responsive to connection movement through its distortion and subjected only to the force of the mechanism and yielding under the force of the mechanism in both directions.

27. The combination of a frictionally acting dampening mechanism; and a pivotal connection for assembling the mechanism in operative position comprising a resilient yielding rubber means responsive to connection movement through its distortion and subjected only to the force of the mechanism.

28. The combination of a dampening mechanism having relatively rotative friction dampening devices; and a pivotal connection for assembling the mechanism in operative position comprising a resilient yielding rubber means responsive to connection movement through its distortion and subjected only to the force of the mechanism.

29. The combination of relatively movable members; a dampening mechanism; and a pivotal connection for assembling the mechanism in operative position comprising a resilient rubber bushing, a metallic central member within the bushing, and a metallic outer wall around the bushing, said bushing yielding circumferentially to permit of pivotal movement through its distortion and yielding radially to absorb incipient vibrations from the dampening mechanism, said rubber connection being subjected only to pressure from the mechanism.

In testimony whereof I have hereunto set my hand.

HUGH C. LORD.